United States Patent
Immel

(10) Patent No.: US 7,062,965 B2
(45) Date of Patent: Jun. 20, 2006

(54) RESISTIVE LEVEL SENSOR FOR CRYO-LIQUID GAS TANKS

(75) Inventor: Rainer Immel, Dexheim (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/901,656

(22) Filed: Jul. 29, 2004

(65) Prior Publication Data

US 2006/0021431 A1    Feb. 2, 2006

(51) Int. Cl.
*G01F 23/24* (2006.01)
(52) U.S. Cl. .................... 73/295; 73/304 R
(58) Field of Classification Search .................. None
See application file for complete search history.

(56) References Cited

U.S. PATENT DOCUMENTS

| | | | | |
|---|---|---|---|---|
| 3,267,730 A | * | 8/1966 | Satterthwaite et al. | 73/295 |
| 3,283,576 A | * | 11/1966 | Halpin et al. | 73/293 |
| 4,425,795 A | * | 1/1984 | Albrecht et al. | 73/295 |
| 5,111,692 A | * | 5/1992 | McQueen et al. | 73/295 |
| 5,309,133 A | * | 5/1994 | Berger et al. | 338/22 R |
| 5,626,053 A | * | 5/1997 | Williamson | 73/304 R |
| 6,098,457 A | * | 8/2000 | Poole | 73/295 |
| 6,223,595 B1 | * | 5/2001 | Dumbovic et al. | 73/295 |

FOREIGN PATENT DOCUMENTS

WO    WO 98/52004    11/1998

OTHER PUBLICATIONS

Lake Shore Cryotronics, Inc., re: Product Overview—Description and Features, www.lakeshore.com/temp/sen/prtd.html, downloaded Feb. 26, 2004 (2 pages).
Lake Shore Cryotronics, Inc., re: Product Overview (other information) www.lakeshore.com/temp/sen/prtdm.html, downloaded Feb. 26, 2004 (3 pages).
Lake Shore Cryotronics, Inc., re: Tech Specs, www.lakeshore.com/temp/sen/prtdts.html, downloaded Feb. 26, 2004 (3 pages).
Lake Shore Cryotronics, Inc., re: Sensor Packaging, www.lakeshore.com/temp/sen/pack.html, downloaded Feb. 26, 2004 (10 pages).

* cited by examiner

*Primary Examiner*—Hezron Williams
*Assistant Examiner*—Paul M. West
(74) *Attorney, Agent, or Firm*—Harness, Dickey & Pierce, P.L.C.

(57) ABSTRACT

The present invention provides a probe having a resistance that varies with temperature and is operable to determine the quantity of a fluid, such as hydrogen, in a storage tank, such as a cryogenic storage tank. The probe relies upon differing heat transfer rates for the gaseous and liquid phases of the fluid and a change in resistance due to a change in temperature of the probe to ascertain the quantity of fluid within the storage tank. The probe can be configured to account for the geometry of the storage tank thereby providing a linearized signal indicative of the quantity of fluid in the storage tank.

20 Claims, 5 Drawing Sheets

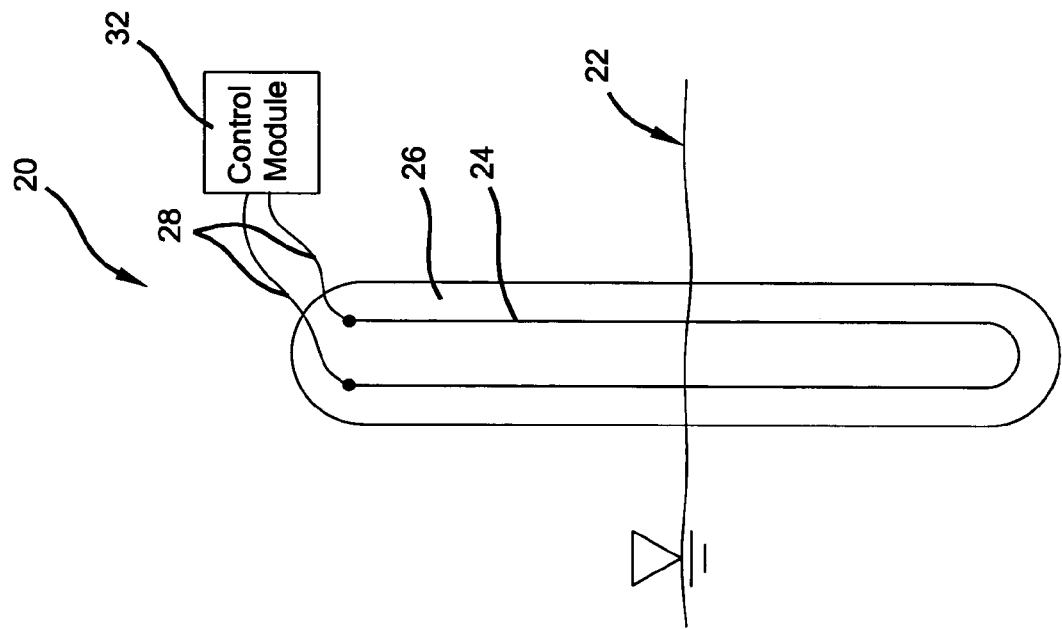

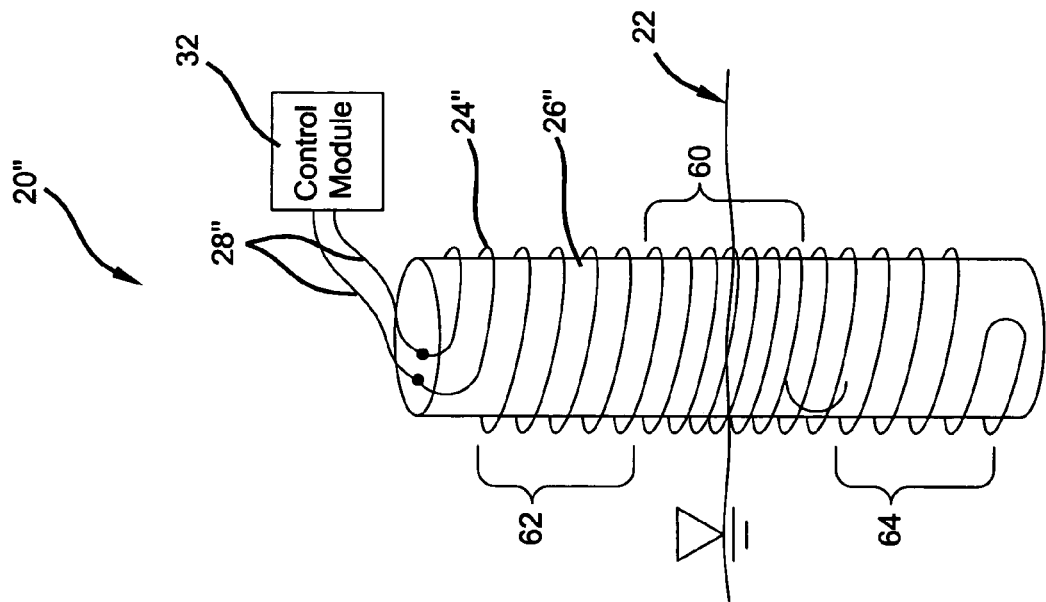
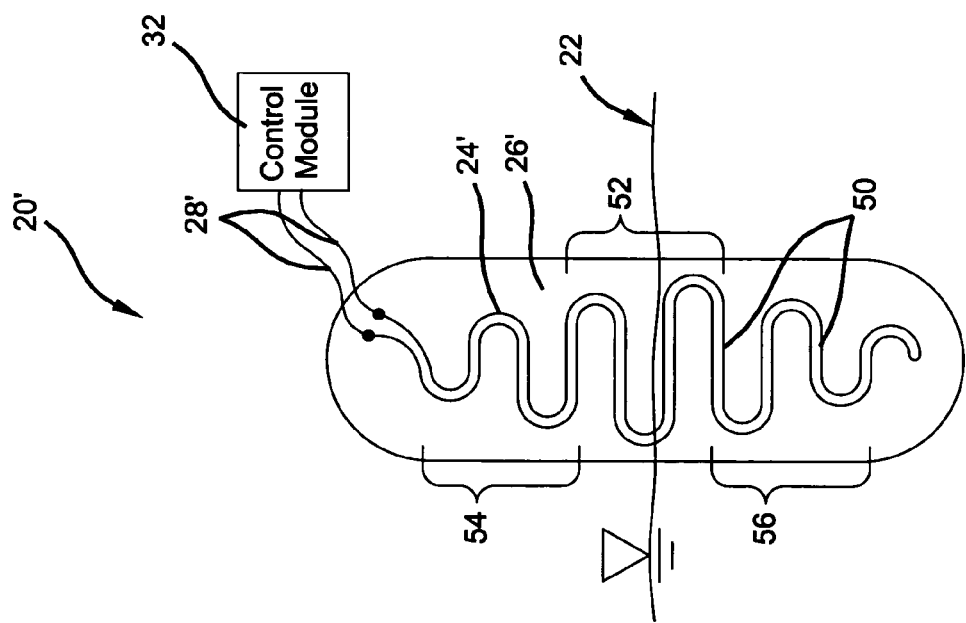

RESISTIVE LEVEL SENSOR FOR CRYO-LIQUID GAS TANKS

FIELD OF THE INVENTION

The present invention relates to measuring devices and more particularly, to a measuring device and a method of using the same for measuring a level of a two-phase fluid in a cryogenic storage tank.

BACKGROUND OF THE INVENTION

Cryogenic tanks are utilized to store a fluid at cryogenic temperatures of typically less than 100° K and even at less than 30° K at pressures in the range of about 1 to 12 bars. Such tanks allow for the efficient storage of fluids that are normally gaseous at ambient temperature and/or pressure. The fluid will be in a two-phase state having a liquid portion and a gaseous portion that vary with the quantity of fluid within the tank, the pressure in the tank and the temperature in the tank.

Currently, the quantity of the fluid having a dielectric property within cryogenic storage tanks is ascertained by the use of a capacitive probe. The capacitive probe has an inner tube that is positioned inside an outer tube with a small annular gap therebetween. The probe is open at both ends with the fluid filling the space within the annular gap. Each of the tubes are electrical conductors and the dielectric constant of fluid therebetween will change with the makeup (liquid phase and gas phase) of the fluid filling the annular gap. The value of the capacitance varies with the dielectric constant and is indicative of an average density of the fluid in the tank, thus yielding the quantity of the fluid within the tank.

To use these probes, lead wires are applied to the inner and outer tubes and are routed through existing piping to a control module that measures the capacitance and is located outside of the storage tank. Typically, these wires will be at least one meter or more in length. Additionally, these lead wires are coaxial shielded wires, which also have an intrinsic capacitance.

When the fluid is hydrogen, the change in the value of the dielectric constant between hydrogen gas and hydrogen liquid is very small. For example, the dielectric constant for gaseous hydrogen is approximately 1.1 while the dielectric constant for liquid hydrogen is approximately 1.2. Thus, there is less than a 10% change in value between the dielectric constant of gaseous and liquid hydrogen. This small differential makes it difficult for the capacitance probe to accurately measure variations in the dielectric constant.

The capacitance of the connecting wires in addition to the capacitance of the probe can further reduce the percentage change in the value of the capacitance between maximum and minimum values (entirely gaseous or entirely liquid hydrogen within the tank). Thus, the probe attempts to generate accurate measurements from relatively small variations in capacitance, which limits the accuracy of the average density measurement.

Hydrogen is extracted from the tank through the gas extraction line. The extraction of the hydrogen changes the temperature in the extraction line. If the coaxial wires are routed through the extraction line, the temperature of the coaxial wires will also change. This may cause the capacitance of the coaxial wires to change and further limit the accuracy of the measure of hydrogen within the tank. The changing temperature may also cause stability problems or variations in the signal being generated therefrom, making an accurate measurement difficult to obtain. Furthermore, since the variation of the capacitance of the probe cannot be linearized to account for the tank geometry, the control module must provide compensation.

SUMMARY OF THE INVENTION

The present invention provides a sensor and a method of using a sensor to detect a quantity of a two-phase fluid in a storage tank. The present invention utilizes the difference in heating of the fraction of a resistor in a liquid as compared to the fraction of the resistor in a gas of a two-phase liquid. The fraction in the liquid warms more slowly than the fraction in the gas, thus enabling the determination of the quantity of the two-phase liquid within the storage tank. The present invention applies to any two-phase fluid, dielectric or otherwise.

A sensor according to the principles of the present invention for detecting a quantity of a two-phase fluid in a tank includes a resistor having a resistance that varies as a function of a temperature of the resistor. There is a power source that is operable to supply at least one of a constant voltage drop across and a constant current to the resistor for a predetermined period. There is also a measuring component operable to measure at least one of a current flow through the resistor when supplied with the constant voltage drop and a voltage drop across the resistor when supplied with the constant current during the predetermined period.

A method of determining a quantity of a fluid in a storage tank includes: (1) positioning a resistor having a resistance that varies with a temperature of the resistor in the tank and in contact with the fluid; (2) inducing a current to flow through the resistor for a predetermined period; (3) measuring a characteristic of the resistor in response to the current flow over the predetermined period; and (4) ascertaining a quantity of the fluid in the tank based on the measured characteristic during the predetermined period.

A method of determining a liquid level of hydrogen in a cryogenic storage tank includes: (1) positioning a resistor having a resistance that varies with a temperature of the resistor in the cryogenic tank and in contact with the hydrogen; (2) supplying one of a constant voltage drop across and a constant current to the resistor for a predetermined period; (3) measuring one of a current flow through the resistor when supplied with the constant voltage drop and a voltage drop across the resistor when supplied with the constant current during the predetermined period; and (4) ascertaining the liquid level of the hydrogen in the cryogenic tank based on one of the measured current flow through the resistor and the voltage drop across the resistor during the predetermined period.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 shows a probe according to the principles of the present invention wherein the resistor is generally U-shaped;

FIG. 2 shows an alternate embodiment of the probe of FIG. 1 wherein the resistor is serpentine in shape and has varying lengths to compensate for a geometry of the tank in which the probe is utilized;

FIG. 3 is another alternate embodiment of the probe of FIG. 1 wherein the resistor is coiled and has a pitch that varies to compensate for the geometry of the tank in which the probe is utilized;

DETAILED DESCRIPTION OF THE PREFERRED EMBODIMENT

Figure 4:
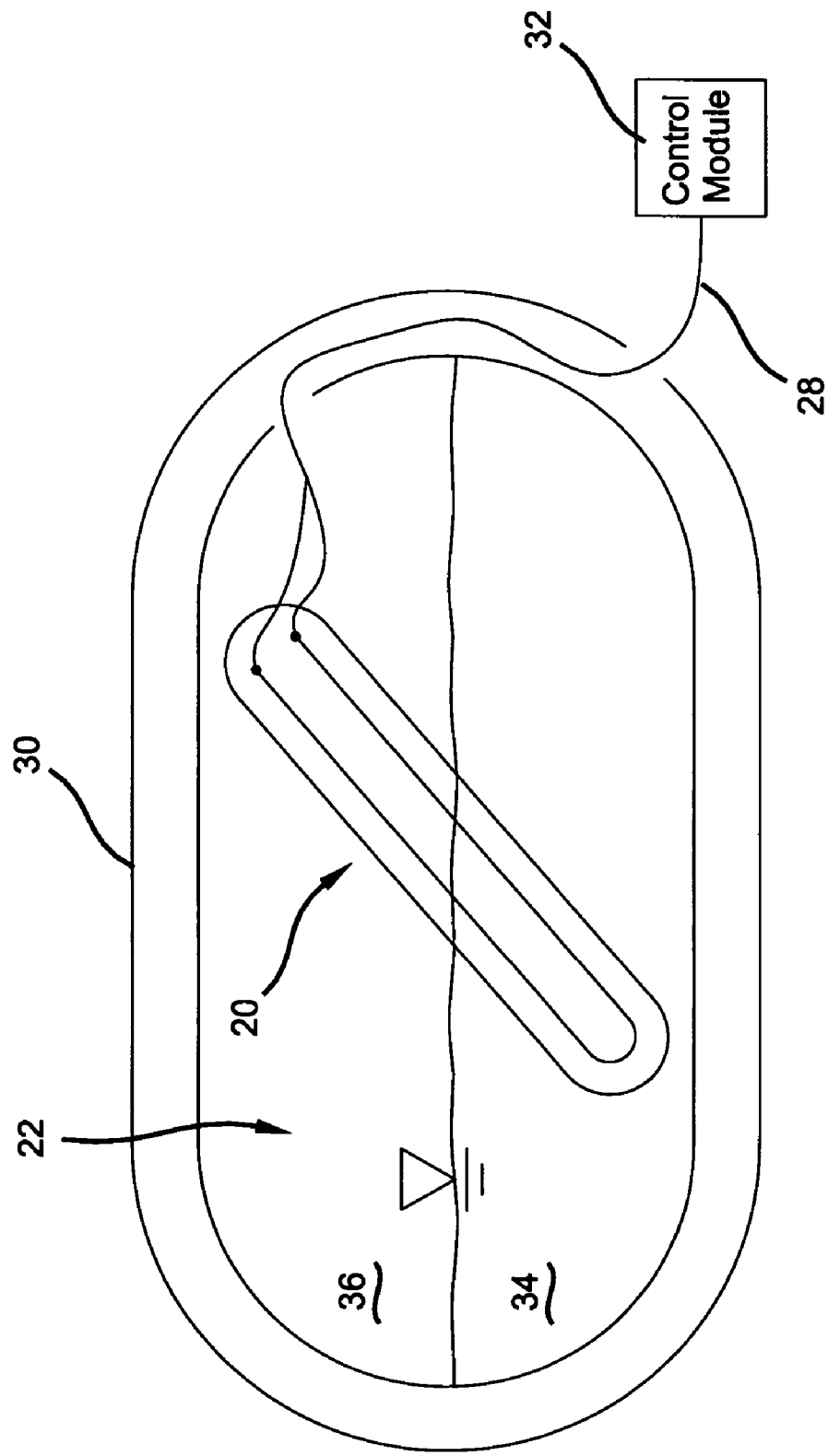
FIG. 4 is a schematic representation of the probe of FIG. 1 placed within a cryogenic storage tank containing a two-phase fluid.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

A probe 20 operable to determine the quantity of a fluid 22, dielectric or otherwise, in a storage tank according to the principles of the present invention is shown in FIG. 1. Probe 20 includes a resistor 24 that is mounted on a frame 26. Resistor 24 has a resistance that varies as a function of its temperature. Resistor 24 can take a variety of forms and materials. For example, resistor 24 can be a platinum wire.

In the preferred embodiment, the resistor 24 is mounted to a frame 26 in a desired configuration. The configuration of resistor 24 in probe 20 can vary. For example, resistor 24 can be generally U-shaped, as shown in FIG. 1, generally serpentine shaped, as shown in FIG. 2, and coiled, as shown in FIG. 3. A pair of lead wires 28 is attached to the ends of resistor 24. Lead wires 28 conduct a current to probe 20 so that probe 20 can be used to determine the quantity of fluid 22 in a storage tank.

Referring now to FIG. 4, probe 20 is shown positioned in a cryogenic storage tank 30 with resistor 24 in direct contact with a fluid 22, such as hydrogen, therein. Lead wires 28 extend from probe 20 to outside of storage tank 30. Lead wires 28 can be routed from inside of storage tank 30 to outside of storage tank 30 in a variety of manners. For example, lead wires 28 can be routed from inside of storage tank 30 to the exterior of storage tank 30 through a gas extraction line (not shown). Lead wires 28 extend from probe 20 to a control module 32 that controls and monitors the operation of probe 20. Probe 20 can be oriented within storage tank 30 in a variety of manners. For example, as shown in FIG. 4, probe 20 can extend diagonally through the interior of storage tank 30 with probe 20 in direct contact with fluid 22. Alternatively, probe 20 can be positioned substantially vertically, as shown in FIGS. 1–3, within storage tank 30. It should be appreciated that FIG. 4 is a schematic representation. Probe 20 is dimensioned and oriented within storage tank 30 so that resistor 24 extends throughout a height of storage tank 30 in which a level of fluid 22 is desired to be known.

Fluid 22 is a two-phase fluid within storage tank 30. Fluid 22 has a liquid portion 34 that, via gravity, will reside in the lower portion of storage tank 30 while a gaseous portion 36 of fluid 22 will reside in the upper portion of storage tank 30. Typically, depending on the respective levels, a portion of resistor 24 will be in direct contact with liquid portion 34 of fluid 22 while a different portion of resistor 24 will be in direct contact with gaseous portion 36 of fluid 22.

Control module 32, as described in more detail below, is operable to cause current to flow through resistor 24 via lead wires 28. When current flows through resistor 24, resistor 24 will heat up and transfer the heat generated therein to fluid 22. The liquid and gaseous portions 34, 36 of fluid 22 have differing heat transfer rates. Heat is transferred more readily to liquid portion 34 than to gaseous portion 36. Thus, the rate at which heat is transferred from resistor 24 to fluid 22 will vary for the two different portions of resistor 24. With this varying heat transfer rate, the portion of resistor 24 in direct contact with liquid portion 34 will have a lower temperature increase than that of the portion of resistor 24 in direct contact with gaseous portion 36.

The present invention utilizes these differing rates of heat transfer to ascertain the quantity of fluid within storage tank 30. To accomplish this, a first embodiment of control module 32, as shown in FIG. 5A, uses a power source 38 to supply a constant current for a predetermined period of time to resistor 24. The current flow causes the temperature of resistor 24 to increase with respect to time. A measuring component, in this embodiment in the form of a voltage sensor 40 in control module 32, monitors the voltage drop across resistor 24 with respect to time for the predetermined period of time. Because the resistance of resistor 24 changes with its temperature, the voltage drop across resistor 24 will change as the temperature of resistor 24 changes with respect to time.

Figure 6:
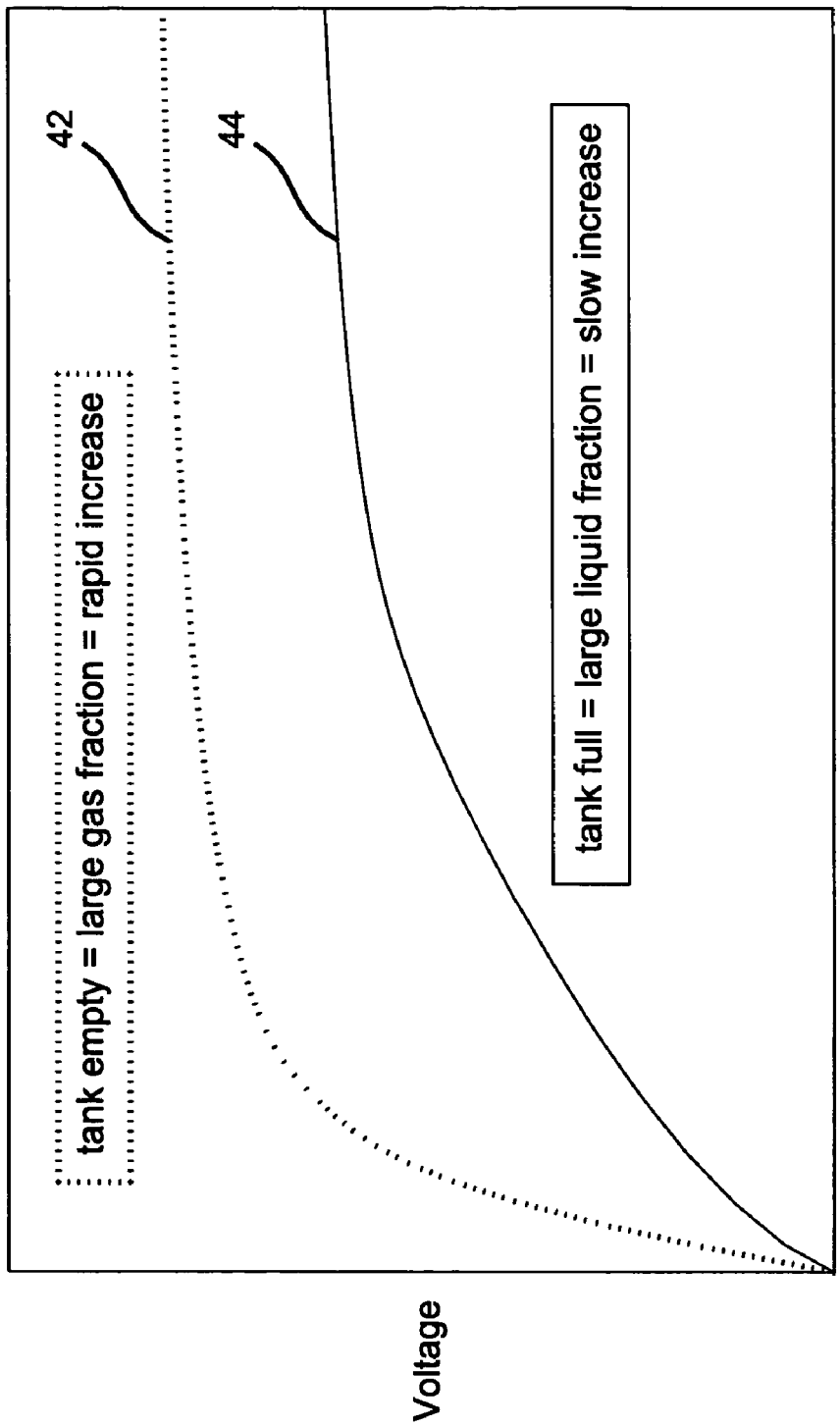
FIG. 6 is a graph representing a correlation between a voltage across the probe of FIG. 1 as a function of time for different levels of liquid fluid within the storage tank.

Differing levels of liquid portion 34 within storage tank 30 cause differing rates of voltage drop across resistor 24 over time in response to the constant current flow. In FIG. 6, curve 42 represents a voltage drop across resistor 24 as a function of time in response to the constant current flowing through resistor 24 when storage tank 30 is essentially empty, which corresponds to a large gaseous portion 36 with relatively little or no liquid portion 34. Curve 44 represents a voltage drop across resistor 24 as a function of time in response to the constant current flowing through resistor 24 when storage tank 30 is essentially full, which corresponds to a large liquid portion 34 with relatively little or no gaseous portion 36. As indicated by the shape of curve 42 relative to curve 44, when storage tank 30 is essentially empty of liquid portion 34 the voltage drop across resistor 24 increases more quickly over time than in the case when storage tank 30 is essentially full of liquid portion 34. The difference between these two curves is a direct result of the differing heat transfer rates of resistor 24 to liquid and gaseous portions 34, 36 of fluid 22. Similar curves for differing levels of liquid portion 34 and gaseous portion 36 lie between these two extreme conditions. Thus, a direct relationship exists between the voltage drop across resistor 24 as a function of time in response to the constant current flow through resistor 24 and the liquid level of fluid 22 within storage tank 30.

With this direct relationship, a tank level module 46 in control module 32, as described below, can determine the liquid level within storage tank 30. The total quantity of fluid 22 within storage tank 30 can be computed by knowing the liquid level, the volume of the tank, the temperature and pressure within the tank, and the properties of the fluid 22 when saturated. Thus, a probe 20 according to principles of present invention can be supplied with a constant current flow while the voltage drop is measured and the quantity of fluid 22 within storage tank 30 determined.

Tank level module 46 can use empirical data to ascertain the liquid level of fluid 22 within storage tank 30. Empirical data of various voltage drop curves as a function of time for constant current flowing through resistor 24 for various liquid levels of fluid 22 in a tank can be developed and stored in a lookup table 48. The resulting voltage drop as a function of time obtained with probe 20 can be compared to the empirical data and the liquid level and/or the quantity of fluid 22 within storage tank 30 ascertained therefrom. Such empirical data would be developed for each type of probe 20 and storage tank 30 in which probe 20 is to be used as well as for probe position.

Alternatively, tank level module 46 can use an algorithm to ascertain the liquid level and/or the quantity of fluid 22 within storage tank 30. That is, a formula can be developed giving the voltage drop as a function of time for a parameter, such as liquid level, and that parameter would vary the shape of the resulting voltage drop curve. The algorithm would then determine the value of the parameter that allows that formula to make the best fit to the curve of the measured voltage drop.

It is envisioned that a user of probe 20 will want to know the quantity of fluid 22 in storage tank 30 at a specific pressure, such as the normal operating pressure. Thus, when the pressure within storage tank 30 differs from the operating pressure (the pressure at which storage tank 30 is operated when fluid 22 is being drawn from storage tank 30), compensation for this pressure difference can be utilized to provide the quantity of fluid 22 in storage tank 30 at its operating pressure. The pressure in storage tank 30 can vary for a variety of reasons. For example, when fluid 22 is stored in a cryogenic storage tank, influx of heat into the fluid causes an increase or decrease in gaseous portion 36, thereby increasing the pressure inside storage tank 30. To compensate for this differing pressure, the indicated quantity of fluid 22 is adjusted to account for the differing properties of the fluid 22 at that pressure. This compensation is made to the determination of the quantity of fluid 22 within storage tank 30 by tank level module 46 within control module 32.

Figure 5B:
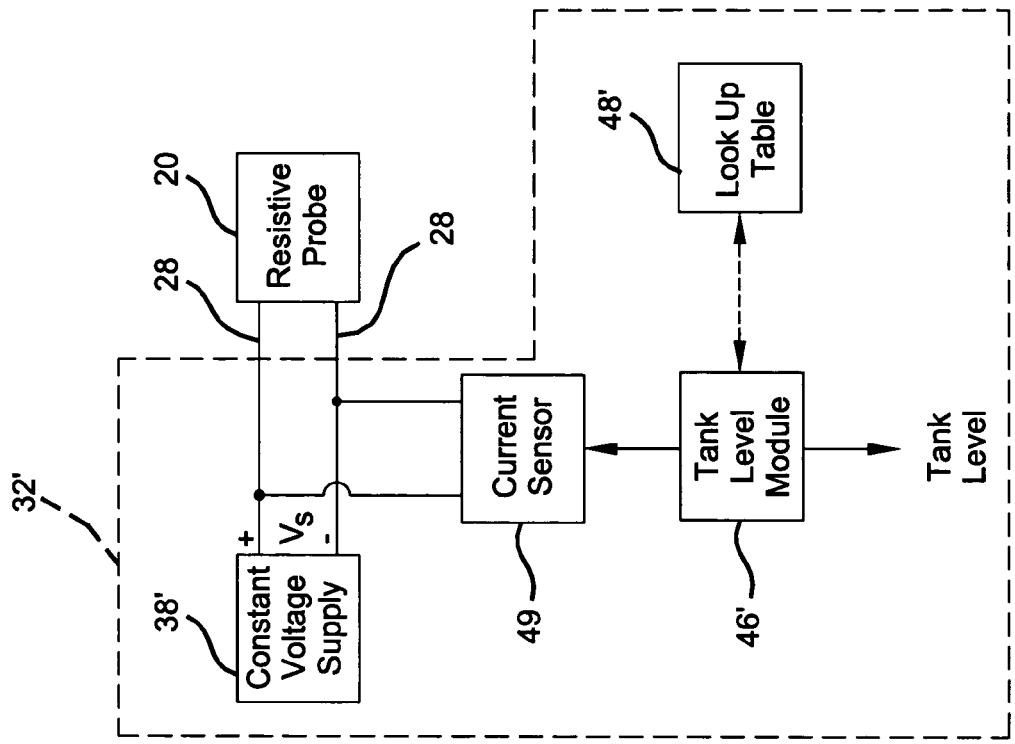
FIGS. 5A–B are schematic representations of alternate control modules of the present invention.
Figure 5A:
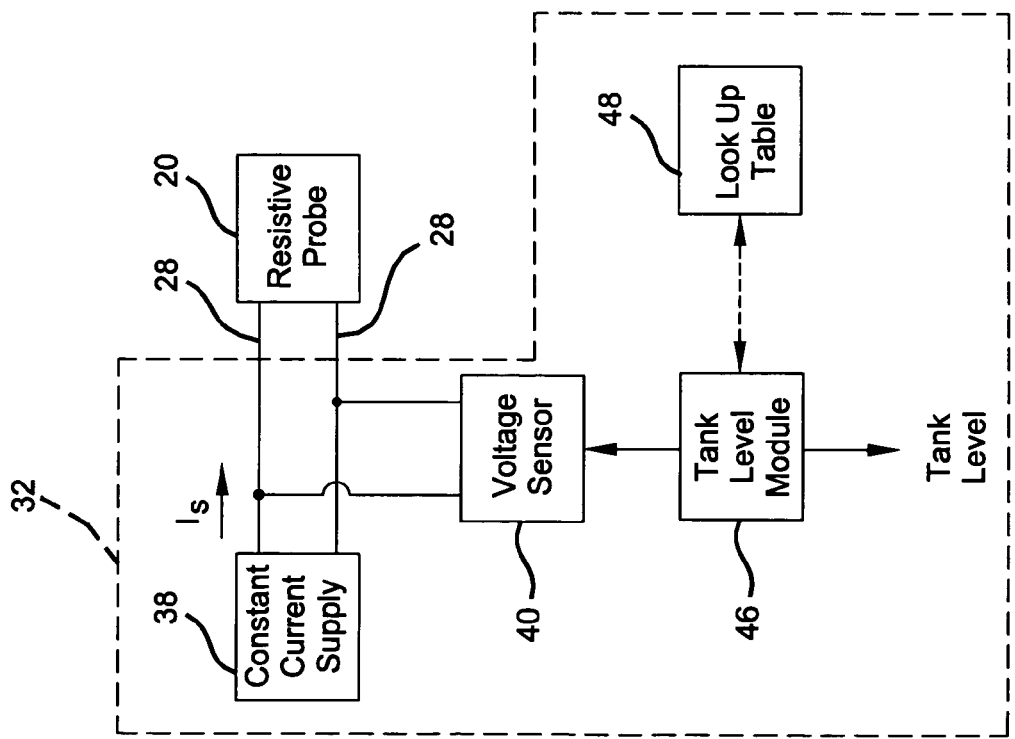

A second or alternate embodiment of control module 32' is shown in FIG. 5B. In this embodiment, control module 32' uses a power source 38' that is operable to supply a constant voltage drop across resistor 24 for a predetermined period of time. The constant voltage drop induces current flow through resistor 24 which in turn generates heat and increases the temperature of resistor 24. In this embodiment, the measuring component is in the form of a current sensor 49 in control module 32' that monitors the current flow through resistor 24 for the predetermined period of time. Because the resistance of resistor 24 changes with its temperature, the current flow induced by the constant voltage drop will change as the temperature of resistor 24 changes.

Differing levels of liquid portion 34 within storage tank 30 cause differing rates of current flow over time in response to the constant voltage drop. As a result, curves (not shown) of the current flow through resistor 24 as a function of time in response to the constant voltage drop across resistor 24 will be indicative of the relative liquid and gaseous portions 34, 36 within storage tank 30. The curves are similar to those discussed above with reference to FIG. 6. Accordingly, supplying a constant voltage drop across resistor 24 can be utilized to develop empirical data and/or algorithms, in the same way discussed above, that are indicative of the quantity of fluid 22 in storage tank 30. Tank level module 46' can use look up table 48' and the empirical data or the algorithm to ascertain the quantity of fluid 22 within storage tank 30. Tank level module 46' can also compensate for pressure deviations in the storage tank 30, if needed.

Probe 20 is not intended for continuous use. Rather, probe 20 is designed to provide intermittent measures of the quantity of fluid 22 within storage tank 30. For this reason, control module 32 provides either a constant current flow through or a constant voltage drop across resistor 24 discontinuously. Each occurrence continues for a predetermined period of time. Furthermore, because resistor 24 generates heat during use, it is preferred that resistor 24 be allowed to cool to the temperature of fluid 22 between measurements. With this preferred operation, it is envisioned that probe 20 will be utilized to provide a measure of the quantity of fluid 22 within storage tank 30 on an as needed basis or at predetermined time intervals to provide discrete measures at discrete times.

It is also envisioned that probe 20 will be used to measure the quantity of a fluid 22, such as hydrogen, that is stored within a cryogenic storage tank 30. Cryogenic storage tanks store the fluid therein at extremely low temperatures and great efforts are made to minimize the influx of heat into the fluid within the cryogenic storage tank. It is preferred that the current flowing through resistor 24 and/or the voltage across resistor 24 is maintained at a level and operated for a duration of time that limits or minimizes the heat influx. Thus, it is preferred that resistor 24 have a relatively low resistance and that the current flowing therethrough, whether being provided as a constant current or being generated by a constant voltage drop, be in milliamps and that the output of resistor 24 be in the milliwatt range.

In an alternate embodiment, resistor 24 is configured on probe 20 to compensate for the geometry of storage tank 30 within which probe 20 is to be used. For example, when storage tank 30 is a horizontal cylindrical tank, the tank is largest around approximately the 50% level or middle portion of the tank. In the U-shaped configuration, the empirical data and/or algorithm compensate for the geometry of the tank. However, instead of using the empirical data and/or algorithm to compensate for the geometry of storage tank 30, resistor 24 can be configured to provide such compensation. For example, in one embodiment, as shown in FIG. 2, resistor 24' is arranged in a serpentine configuration or shape on frame 26'. The serpentine configuration comprises a plurality of segments 50 of varying lengths that are each interconnected together. The middle segments, generally indicated as 52, have a longer length than the upper and lower segments, generally indicated as 54 and 56, respectively. The lengths of the various segments 50 are chosen so that the quantity of resistor 24' at any location within storage tank 30 is in proportion to the volumetric portion of storage tank 30 at that location. Thus, when liquid portion 34 occupies 50% of storage tank 30, approximately 50% of resistor 24' is in direct contact with liquid portion 34 while the other 50% of resistor 24' is in direct contact with gaseous portion 36. Therefore, by making resistor 24' serpentine in shape and having segments 50 of varying lengths, the geometry of storage tank 30 can be compensated for with the configuration of resistor 24'.

Referring now to FIG. 3, another alternate embodiment of probe 20" that compensates for the geometry of storage tank 30 is shown. In this embodiment, resistor 24" is coiled around a cylindrical frame 26". The pitch of resistor 24" as it coils around frame 26" varies in accordance with the geometry of storage tank 30. For example, when storage tank 30 is a horizontal cylindrical tank which is biggest around the 50% liquid level, the pitch of a middle portion 60 of coiled resistor 24" is different than the pitch of upper and lower portions 62, 64 of coiled resistor 24". The pitch is chosen to compensate for the tank geometry. When liquid portion 34 occupies approximately 50% of the total volume of storage tank 30, approximately 50% of coiled resistor 24" will be in direct contact with liquid portion 34 while the other 50% of coiled resistor 24" will be in direct contact with gaseous portion 36. Thus, in the coiled configuration, the pitch of coiled resistor 24" can be varied to compensate for the geometry of storage tank 30.

It should be appreciated that variations in the embodiments shown above can be implemented without departing from the spirit and scope of the present invention. For example, while resistor 24 is shown as being generally U-shaped, serpentine or coiled, other shapes and configurations can also be employed, such as zigzagging, diagonally oriented, spiraling and the like. Furthermore, the probe can be configured to compensate for tank geometries that are other than horizontal cylindrical tanks. Thus, the description of the invention is merely exemplary in nature and variations that do not depart from the gist of the invention are intended to be within the scope of the invention. Such variations are not to be regarded as a departure from the spirit and scope of the invention.

What is claimed is:

1. A level sensor for detecting a quantity of a fluid in a tank, the sensor comprising:
   a resistor having a resistance that varies as a function of a temperature of said resistor, said resistor having a shape that compensates for a varying geometry of the tank, and said resistor includes a wire having a substantially serpentine shape;
   a power source operable to supply at least one of a constant voltage drop across and a constant current to said resistor for a predetermined period; and
   a measuring component operable to measure at least one of a current flow through said resistor when supplied with said constant voltage drop and a voltage drop across said resistor when supplied with said constant current during said predetermined period.

2. The sensor of claim 1, wherein said serpentine-shaped wire has a plurality of segments of varying lengths.

3. The sensor of claim 2, wherein said varying lengths of said segments compensate for the geometry of the tank.

4. The sensor of claim 1, wherein said resistor is mounted on a frame.

5. The sensor of claim 1, wherein said resistor is substantially vertically oriented in the tank.

6. The sensor of claim 1, wherein said resistor is diagonally oriented in the tank.

7. The sensor of claim 1, wherein the fluid has a dielectric property.

8. The sensor of claim 1, wherein said shape of said resistor is configured to compensate for a non-linearly varying volumetric capacity of the tank.

9. A level sensor for detecting a quantity of a fluid in a tank, the sensor comprising:
   a resistor having a resistance that varies as a function of a temperature of said resistor, said resistor having a shape that compensates for a varying geometry of the tank, and said resistor includes a wire having a substantially coil shape;
   a power source operable to supply at least one of a constant voltage drop across and a constant current to said resistor for a predetermined period; and
   a measuring component operable to measure at least one of a current flow through said resistor when supplied with said constant voltage drop and a voltage drop across said resistor when supplied with said constant current during said predetermined period.

10. The sensor of claim 9, wherein said coil shaped wire has a pitch that varies.

11. The sensor of claim 10, wherein said varying pitch of said coil shaped wire compensates for a geometry of the tank.

12. A method of determining a quantity of a fluid in a tank, the method comprising:
   (a) positioning a generally coil-shaped resistor with a pitch that varies and having a resistance that varies with a temperature of said resistor in the tank and in contact with the fluid, said resistor being oriented so that said varying pitch of said resistor compensates for said geometry of the tank;
   (b) inducing current flow through said resistor during a predetermined period of time;
   (c) measuring a characteristic of said resistor in response to said current flow over said predetermined period of time; and
   (d) ascertaining a quantity of the fluid in the tank based on said measured characteristic during said predetermined period of time.

13. The method of claim 12, wherein (b), (c) and (d) are performed more than once and further comprising allowing a temperature of said resistor to substantially equalize with a temperature of the fluid between each performance of (b).

14. The method of claim 12, wherein (b) includes inducing said current flow by supplying one of a constant voltage drop across and a constant current to said resistor, and (c) includes measuring one of a current flow through said resistor when supplied with said constant voltage drop and a voltage drop across said resistor when supplied with said constant current.

15. The method of claim 12, wherein (d) includes comparing said measured characteristic to empirical data to ascertain the quantity.

16. The method of claim 12, wherein (d) includes ascertaining the quantity by using an algorithm to determine a best fit to a curve of said measured characteristic over said predetermined period of time.

17. The method of claim 12, wherein the tank is a cryogenic storage tank and the fluid is hydrogen.

18. The method of claim 12, wherein (d) includes ascertaining a quantity of a fluid having a dielectric property.

19. A method of determining a guantity of a fluid in a tank, the method comprising:
   (a) positioning a generally serpentine-shaped resistor with a plurality of segments of varying lengths and having a resistance that varies with a temperature of said resistor in the tank and in contact with the fluid, said resistor being oriented so that said varying lengths of said segments of said resistor compensates for said geometry of the tank;
   (b) inducing current flow through said resistor during a predetermined period of time;
   (c) measuring a characteristic of said resistor in response to said current flow over said predetermined period of time; and (d) ascertaining a guantity of the fluid in the tank based on said measured characteristic during said predetermined period of time.

20. A method of determining a quantity of a fluid in a tank, the method comprising:
- (a) positioning a resistor having a resistance that varies with a temperature of said resistor in the tank and in contact with the fluid;
- (b) inducing current flow throuah said resistor during a predetermined period of time;
- (c) measuring a characteristic of said resister in response to said current flow ever said predetermined period of time; and
- (d) ascertaining a quantity of the fluid in the tank based on said measured characteristic during said predetermined period of time and compensating for a pressure level in the tank.

* * * * *